United States Patent
Sadakata et al.

(10) Patent No.: US 8,723,089 B2
(45) Date of Patent: May 13, 2014

(54) INDUCTION HEATING APPARATUS

(75) Inventors: Hideki Sadakata, Osaka (JP); Hiroshi Tominaga, Hyogo (JP); Yoshiaki Ishio, Hyogo (JP); Izuo Hirota, Hyogo (JP)

(73) Assignee: Panasonic Corporation, Osaka (JP)

( * ) Notice: Subject to any disclaimer, the term of this patent is extended or adjusted under 35 U.S.C. 154(b) by 1602 days.

(21) Appl. No.: 11/917,713

(22) PCT Filed: Jun. 16, 2006

(86) PCT No.: PCT/JP2006/312153
§ 371 (c)(1),
(2), (4) Date: Dec. 14, 2007

(87) PCT Pub. No.: WO2006/135056
PCT Pub. Date: Dec. 21, 2009

(65) Prior Publication Data
US 2009/0086519 A1     Apr. 2, 2009

(30) Foreign Application Priority Data
Jun. 17, 2005   (JP) ................................. 2005-177238

(51) Int. Cl.
*H05B 6/04*     (2006.01)
*H02M 7/537*    (2006.01)

(52) U.S. Cl.
USPC ........... 219/660; 219/625; 219/663; 219/665; 363/131; 363/97; 363/98; 363/75; 363/132

(58) Field of Classification Search
USPC ......... 219/625–627, 660–661, 663, 665–667; 363/131, 97, 98, 75, 79, 132
See application file for complete search history.

(56) References Cited

U.S. PATENT DOCUMENTS 5,274,208 A * 12/1993 Noda .......................... 219/715
5,925,278 A    7/1999 Hirst
(Continued)

FOREIGN PATENT DOCUMENTS

EP   1 341 401        9/2003
EP   1341401 A2 *    9/2003
(Continued)

OTHER PUBLICATIONS

Supplementary European Search Report issued Sep. 17, 2009 in corresponding European Patent Application No. 06 75 7386.

(Continued)

*Primary Examiner* — Dana Ross
*Assistant Examiner* — Ket D Dang
(74) *Attorney, Agent, or Firm* — Wenderoth, Lind & Ponack, LLP.

(57) ABSTRACT

An induction heating apparatus is capable of stop heating without excessively boosting output voltages of a booster circuit and a power factor correction circuit. The induction heating apparatus includes a boosting function unit, an inverter circuit, and a booster circuit controller. The boosting function unit includes a power factor correction circuit and a booster circuit, and boosts an input direct-current power to a direct-current voltage having a peak value larger than the peak value of the input direct-current power by turning on/off a switching element. The inverter circuit includes a heating coil, and inputs the direct-current voltage output by the boosting function unit to generate a high frequency current in the heating coil by turning on or off a different switching element. The booster circuit controller stops a boosting operation of the boosting function unit without a prescribed delay from the stop of an operation of the inverter circuit.

16 Claims, 2 Drawing Sheets

(56) References Cited

U.S. PATENT DOCUMENTS

| | | | |
|---|---|---|---|
| 6,151,232 A * | 11/2000 | Furuhashi et al. | 363/97 |
| 6,222,746 B1 * | 4/2001 | Kim | 363/89 |
| 6,770,857 B2 * | 8/2004 | Hirota et al. | 219/626 |

FOREIGN PATENT DOCUMENTS

| | | |
|---|---|---|
| JP | 1-246783 | 10/1989 |
| JP | 6-189562 | 7/1994 |
| JP | 2003-257609 | 9/2003 |
| JP | 2004-171934 | 6/2004 |

OTHER PUBLICATIONS

International Search Report issued Sep. 19, 2006 in the International (PCT) Application of which the present application is the U.S. National Stage.

Patent Cooperation Treaty (PCT) International Preliminary Report on Patentability in corresponding International Application No. PCT/JP2006/312153, Sep. 3, 2009.

* cited by examiner

Fig.1

INDUCTION HEATING APPARATUS

TECHNICAL FIELD

The present invention relates to an induction heating apparatus such as an induction heating cooking device that inductively heats a cookware using electromagnetic induction, and can be used in a general household, an office, a restaurant, a factory, and so forth.

BACKGROUND ART

A conventional induction heating apparatus supplies a boosted voltage to an inverter circuit by using a booster circuit, so that a high-frequency power is supplied to a load via a heating coil (for example, see patent document 1).

In addition, it is known that a power factor correction circuit is built in the induction heating apparatus to perform a harmonic current suppression of an input current (for example, see patent document 2).

Patent document 1: JP-A-2003-257609
Patent document 2: JP-A-01-246783

DISCLOSURE OF THE INVENTION

Problems to be Solved by the Invention

However, in the induction heating apparatus using the conventional art, when the booster circuit or the power factor correction circuit having a boost function is stopped when heating is stopped, a load impedance viewed from the booster circuit and the power factor correction circuit suddenly becomes higher. The booster circuit and the power factor correction circuit having the boost function maintain a boosting level during heating, until an output voltage feedback having a predetermined time constant is applied. Therefore, at the moment of increasing the load impedance, each output voltage of the booster circuit and the power factor correction circuit is excessively boosted. For this reason, there is a problem that a voltage exceeding rated breakdown strength of each element is applied to an output capacitor of the booster circuit and an output capacitor of the power factor correction circuit or a switching device of the inverter circuit for inputting output voltages of these output capacitors, resulting in element destruction.

In order to solve the above-described conventional problem, the present invention is provided, and an object of the present invention is to provide the induction heating apparatus capable of stopping a boosting operation of a boosting function unit having the boosting function and a heating operation of the inverter circuit, without excessively boosting an output voltage of the boosting function unit.

Means to Solve the Problems

In order to solve the above conventional problem, an induction heating apparatus of the present invention includes: a boosting function unit that includes a choke coil and a switching element having a high potential side terminal connected to an output end of the choke coil, the switching element being used for a boosting operation in which the switching element is turned on to accumulate energy in the choke coil and is turned off to supply the energy to a capacitor of an output side via a diode, the boosting function unit inputting a direct-current (DC) power, boosting the DC power to a DC voltage having a peak value larger than the peak value of the DC power, and outputting the boosted DC voltage; an inverter circuit having a heating coil, which inputs the DC voltage outputted from the booster function unit to generate a high frequency current in the heating coil by the on/off operation of a different switching element; a boosting control unit that controls a boosting operation of the boosting function unit by conduction-controlling the switching element of the boosting function unit; and an inverter controller that controls an operation of the inverter circuit, wherein the boosting control unit stops conduction-controlling of the switching element, prior to the stop of the operation of the inverter circuit controlled by the inverter controller, in order to prevent a load impedance viewed from the boosting function unit from rapidly and largely being changed during a period in which the boosting function unit performs the boosting operation after the conduction-controlling of the switching element is stopped.

With this structure, when the heating operation is stopped, the inverter circuit, being the load, is continuously driven while at least the booster circuit performs the boosting operation, thus making it possible to surely prevent the excessive boost of the output voltage of the booster circuit which is caused by a sudden large fluctuation of the load impedance viewed from the booster circuit. Therefore, the output voltage of the boosting function unit can be immediately dropped, and the heating operation can be safely stopped.

The other induction heating apparatus may have: a boosting function unit that inputs a direct-current power, boosts the direct-current power to a direct-current voltage having a peak value larger than a peak value of the direct-current power by on/off operation of a switching element, and outputs the boosted direct-current voltage; an inverter circuit having a heating coil, which inputs the direct-current voltage output from the booster function unit to generate a high frequency current in the heating coil by on/off operation of a different switching element; a boosting control unit that controls a boosting operation of the boosting function unit; and an inverter controller that controls an operation of the inverter circuit. In this case, the boosting function unit may include: a power factor correction circuit that inputs a DC power obtained by rectifying an alternating-current (AC) power, outputs a smoothed DC voltage to a first capacitor, and corrects a power factor of the AC power; and a booster circuit that inputs the DC voltage outputted from the power factor correction circuit, boosts the input DC voltage to the DC voltage having a peak value larger than the peak value of the input DC voltage, and outputs the boosted voltage to a second capacitor. The boosting control unit may include: a power factor correction circuit controller that controls the power factor correction circuit; and a booster circuit controller that controls the booster circuit. In this case, the boosting control unit may stop a boosting operation of the booster circuit, prior to the stop of the operation of the inverter circuit by the inverter controller. With this structure, when the heating operation is stopped, the inverter circuit, being the load, is driven while at least the booster circuit performs the boosting operation. Therefore, it is possible to surely prevent the excessive boosting of the output voltage of the booster circuit which is caused by a large fluctuation of the load impedance viewed from the booster circuit. Therefore, the output voltage of the booster circuit can be immediately dropped, and the heating operation can be safely stopped.

The power factor correction circuit may boost the input DC power to a voltage having a peak value larger than the peak value of the input DC power, and outputs the boosted voltage to the first capacitor. The power factor correction circuit controller may stop the boosting operation of the power factor correction circuit, prior to the stop of the operation of the inverter circuit. With this structure, the boosting function can be shared by the power factor correction circuit and the booster circuit, thus making it possible to realize a miniaturization of the booster circuit at a low cost. In addition, the inverter circuit, being the load, is driven while at least the boosting operation is performed by the power factor correction circuit when the heating operation is stopped. Therefore, it is possible to surely prevent the excessive boosting of the output voltage of the power factor correction circuit which is caused by a sudden large fluctuation of the load impedance viewed from the power factor correction circuit. Thus, the output voltage of the power factor correction circuit can be immediately dropped and the heating operation can be safely stopped.

Preferably, the boosting control unit stops the boosting operation of the booster circuit, prior to the stop of the boosting operation of the power factor correction circuit controlled by the power factor correction circuit controller. Thus, it is possible to prevent the inverter circuit from being operated in a state of losing the power factor correction function of the power factor correction circuit and to prevent a surrounding power supply environment from being influenced.

The boosting function unit may include a power factor correction circuit that inputs a DC power obtained by rectifying an AC power, boosts the DC power to a voltage having a peak value larger than the peak value of the input DC power, outputs the boosted voltage to a first capacitor, and corrects a power factor of the AC power. The boosting control unit may include a power factor correction circuit controller that controls an operation of the power factor correction circuit. In this case, the power factor correction circuit controller may stop the boosting operation of the power factor correction circuit, prior to the stop of the operation of the inverter circuit. According to this structure, the power factor correction circuit has the boosting function, thus making it possible to realize the miniaturization of the boosting/power factor correction circuits at a lower cost, and surely prevent the excessive boosting of the output voltage of the power factor correction circuit which is caused by a large fluctuation of the load impedance viewed from the power factor correction circuit, because the inverter circuit, being the load, is driven while at least the power factor correction circuit performs the boosting operation when the heating operation is stopped. Therefore, the output voltage of the power factor correction circuit can be immediately dropped and the heating operation can be safely stopped.

The boosting control unit may stop the boosting operation of the boosting function unit while the inverter controller drives the inverter circuit and controls the fluctuation of the conduction time of a switching element of the inverter circuit so that a fluctuation width of an output value of the inverter circuit is set at a prescribed value or less (for example, while the inverter circuit is operated in a prescribed fluctuation width or less of an operation frequency and on-time), in order to suppress an amount of fluctuation of the load impedance viewed from the boosting function unit in process of stopping boosting operation of the boosting function unit. Therefore, a fluctuation amount of a load impedance viewed from the booster circuit is suppressed in a process of stopping the boosting operation of the boosting function unit. This makes it possible to safely stop the boosting operation of the boosting function unit, without excessively boosting the output voltage of the boosting function unit beyond breakdown voltage of an output capacitor of each circuit and the switching element of the inverter circuit.

In order to fix the load impedance viewed from the boosting function unit in process of stopping boosting operation of the boosting function unit, when the inverter controller fixes the output value of the inverter circuit to a prescribed value and drives the inverter circuit, the boosting control unit may stop the boosting operation of the boosting function unit. Therefore, the load impedance viewed from the boosting function unit is fixed in a process of stopping the boosting operation of the boosting function unit. This makes it possible to safely stop the boosting operation of the boosting function unit, without excessively boosting the output voltage of the boosting function unit beyond the breakdown voltage of the output capacitor of each circuit and the switching element of the inverter circuit.

The inverter controller may stop a drive of the inverter circuit when a first drive stop period, in which the voltage of the second capacitor drops, is elapsed after the booster circuit controller stops the boosting operation of the booster circuit. The load impedance viewed from the booster circuit can be set in a state of having small fluctuation because the inverter circuit 15 is continuously driven until the booster circuit is set in a stable stop state and the voltage of the second capacitor drops. Therefore, the output voltage of the booster circuit can immediately drop to safely stop the boosting operation of the booster circuit without adding an excessive boosted voltage beyond the breakdown voltage of its own output capacitor and the switching element of the inverter circuit.

The inverter controller may stop the drive of the inverter circuit when a second drive stop period, in which the voltage of the first capacitor drops, is elapsed after the power factor correction circuit controller stops the boosting operation of the power factor correction circuit. Thus, the power factor correction circuit is set in a stable stop state, and the load impedance viewed from the power factor correction circuit is set in a small fluctuation state until the voltage of the first capacitor drops. Therefore, the output voltage of the power factor correction circuit immediately drops, and the power factor correction circuit can be safely stopped without excessively boosting the output voltage beyond the breakdown voltage of its own output capacitor and the switching element of the inverter circuit.

When a third drive stop period, in which a voltage of the second capacitor drops, is elapsed after the booster circuit controller stops the boosting operation of the booster circuit, the power factor correction circuit controller may stop the boosting operation of the power factor correction circuit, and thereafter, when a fourth drive stop period, in which the voltage of the first capacitor drops, is elapsed, the inverter controller stop may the drive of the inverter circuit. In this case, length of the third drive stop period and length of the fourth drive stop period may be differentiated to correspond to length of a discharge time of the second capacitor after the drive of the booster circuit is stopped and the discharge time of the first capacitor after the drive of the power factor correction circuit is stopped, respectively. According to this structure, it is possible to appropriately secure a third drive stop period and a fourth drive stop period required for setting the booster circuit and the power factor correction circuit in a complete drive stop state. The total time of the drive stop periods can be shortened.

The induction heating apparatus may include a boosted output voltage detector that detects an output voltage of the boosting function unit. When the output voltage detected by the boosted output voltage detector is a prescribed value or less after the boosting control unit stops the boosting operation of the boosting function unit, the inverter controller may stop the operation of the inverter circuit. According to this structure, it is possible to detect a condition that the boosting function unit is set in a stable state after the boosting operation is stopped, or a condition that the boosting function unit is close to the stable state. The load impedance viewed from the boosting function unit is set to have a small fluctuation state until the stable state is detected, because the inverter circuit is driven. By stopping the inverter circuit after the output voltage detected by the boosted output voltage detector is a prescribed value or less, the boosting function unit can be safely stopped without excessively boosting the output voltage beyond the breakdown voltage of the output capacitor of its constituent element and the switching element of the inverter circuit.

The induction heating apparatus further includes an input current detector that detects an input current, wherein the boosting control unit stops the drive of the boosting function unit, and after the input current detected by the input current detector or an input power calculated by the input current is a prescribed value or less, the inverter controller may stop the operation of the inverter circuit. After detecting a condition that the boosting function unit (each boosting function unit when there are a plurality of boosting function units) safely stops the boosting operation, the operation of the inverter circuit can be stopped. The boosting function unit can be safely stopped without excessively boosting the output voltage beyond the breakdown voltage of the output capacitor, being its constituent component, and the switching element, being the constituent component of the inverter circuit.

The induction heating apparatus further includes a conduction time measurement unit that measures a conduction time of a switching element of the boosting function unit, wherein after the boosting control unit stops the boosting operation of the boosting function unit, a conduction time of the switching element is a prescribed value or less and the boosting control unit detects that the boosting operation of the boosting function unit is stably stopped, the inverter controller may stop the operation of the inverter circuit. After the inverter controller detects a condition that the boosting control unit safely stops the boosting operation, it can stop the operation of the inverter circuit. The boosting function unit can be safely stopped with the output voltage not excessively boosted beyond the breakdown voltage of the output capacitor of its constituent component or the switching element of the inverter circuit, in a state that the load impedance viewed from the boosting function unit is in a state of having small fluctuation because the inverter circuit is driven until the boosting operation of the boosting function unit is stopped.

The power factor correction circuit may have: a first choke coil having an input end connected to the DC power; and a first switching element having a high potential side terminal connected to an output end of the first choke coil, so that energy is accumulated in the first choke coil when a switching element is turned on, and the energy is supplied to the first capacitor of an output side via a first diode when the switching element is turned off.

The booster circuit may include: a second choke coil connected to an output end of the power factor correction circuit; and a second switching element having a high potential side terminal connected to an output end of the second choke coil, so that energy is accumulated in the second choke coil when a switching element is turned on, and the energy is supplied to the second capacitor of the output side via a second diode when the switching element is turned off.

Effects of the Invention

The induction heating apparatus of the present invention is capable of stopping the boosting operation of the booster circuit and the heating operation of the inverter circuit, without excessively boosting the output voltage of the boosting function unit when the heating is stopped.

DESCRIPTION OF REFERENCE NUMERALS

1 Commercial power
3 Choke coil (first choke coil)
4 Switching element (first switching element)
5 Diode (first diode)
6 Smoothing capacitor (first capacitor)
7 Power factor correction circuit
8 Choke coil (second choke coil)
11 Switching element (second switching element)
12 Diode (second diode)
13 Smoothing capacitor (second capacitor)
14 Booster circuit
15 Inverter circuit
21 Heating coil
23 Object to be heated (load)
25, 34 Input current detector
26 Microcomputer
28 Inverter circuit controller
29 Boosted output voltage detector
32 Booster circuit controller
33 Power factor correction circuit controller

DETAILED DESCRIPTION OF THE INVENTION

Embodiments of the present invention will be explained with reference to the drawings.

[Configuration of an Induction Heating Apparatus]

Figure 1:
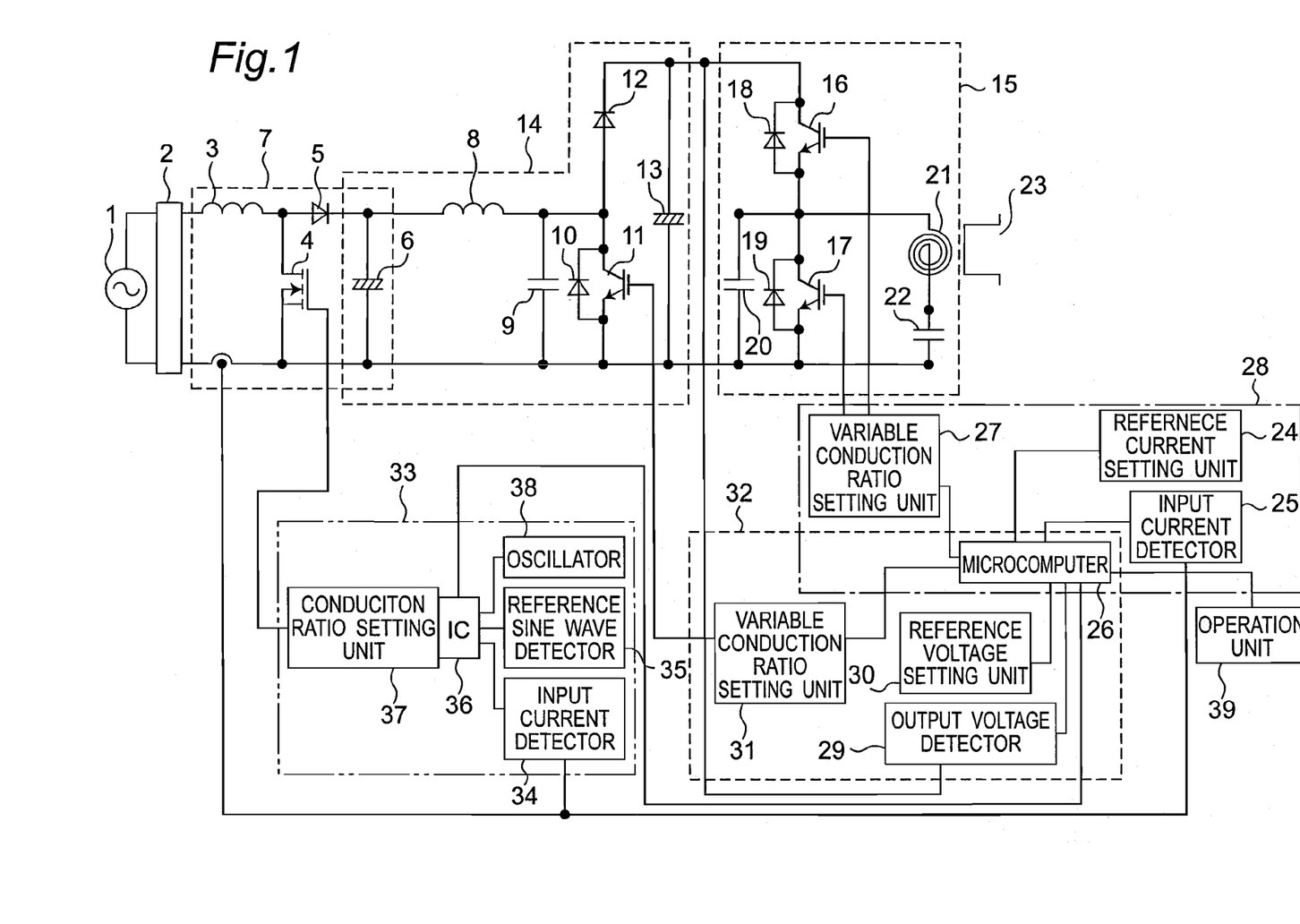
FIG. 1 is a circuit diagram of an induction heating apparatus according to an embodiment of the present invention.

FIG. 1 is a circuit view of an induction heating apparatus according to an embodiment of the present invention. In FIG. 1, commercial power 1 is a 200V commercial power from a power source, being a low frequency AC power. The induction heating apparatus of this embodiment has a rectifier circuit 2 having an input end connected to the commercial power 1; a power factor correction circuit 7 that boosts an output voltage of the rectifier circuit 2; a booster circuit 14 that boosts the output voltage of the power factor correction circuit 7; and an inverter circuit 15 that generates a high frequency current by using an output of the booster circuit 14. The rectifier circuit 2 includes a bridge diode and an input filter.

Figure 2:
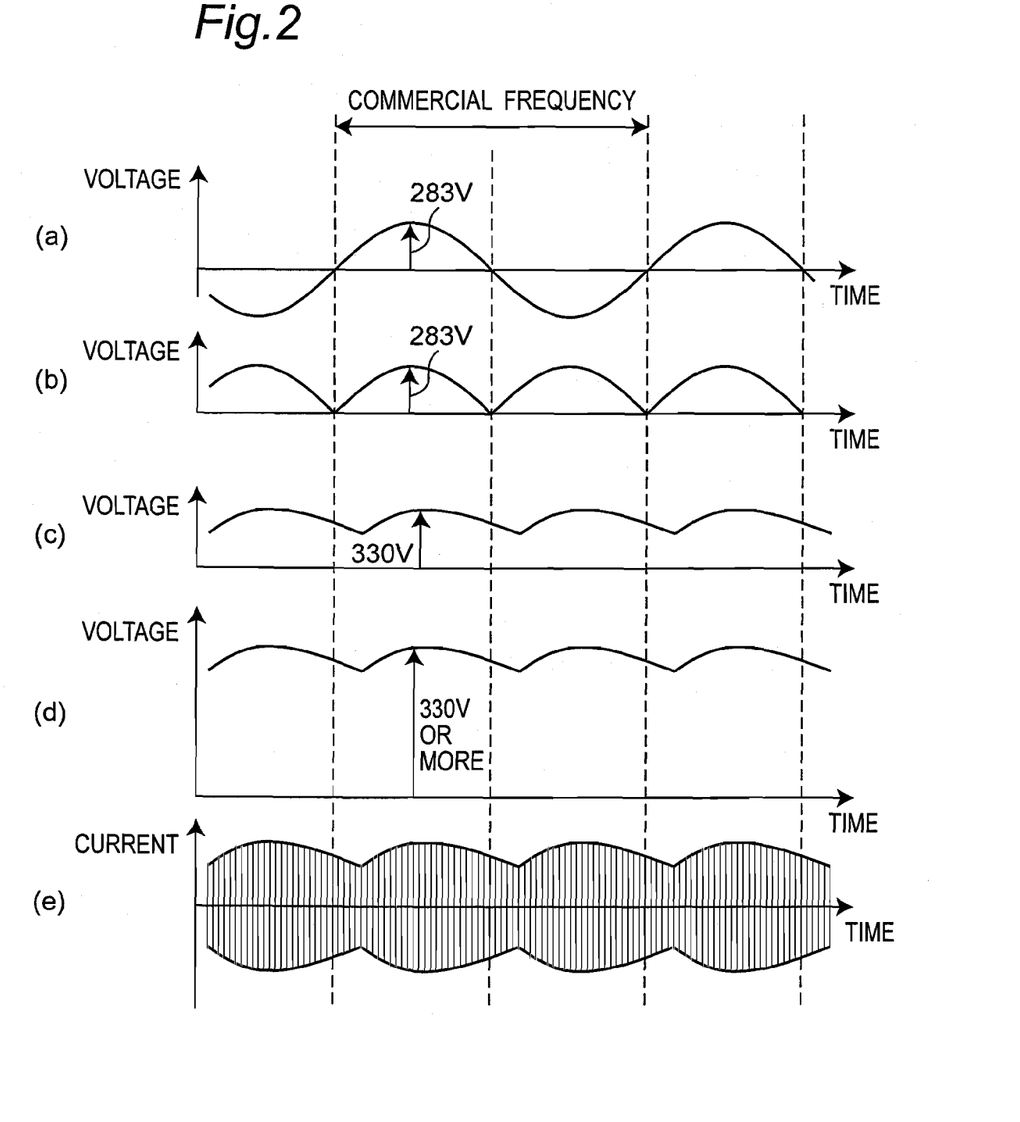
FIG. 2 shows (a) a voltage of a commercial power, (b) an input voltage of a power factor correction circuit, (c) a voltage of a smoothing capacitor in the power factor correction circuit, (d) a voltage of a smoothing capacitor in a booster circuit, and (e) a high frequency current outputted by a heating coil.

The power factor correction circuit 7 has a choke coil 3, being a first choke coil; a switching element 4, being a first switching element (MOSFET in this embodiment); a diode 5, being a first diode; and a smoothing capacitor 6, being a first capacitor, to improve a power factor of the commercial power 1. An input terminal of the choke coil 3 is connected to a higher potential side (positive electrode side) output terminal of the rectifier circuit 2. Further, the higher potential side (drain) of the switching element 4 is connected to a connection point of an output terminal of the choke coil 3 and an anode terminal of the diode 5. A lower potential side terminal (source) of the switching element 4 and the lower potential side terminal of the smoothing capacitor 6 are connected to the lower potential side (negative electrode side) output terminal of the rectifier circuit 2. The higher potential side terminal of the smoothing capacitor 6 is connected to a cathode terminal of the diode 5. The output voltage of the rectifier circuit 2 is applied to the power factor correction circuit 7 as a DC power, and is boosted to an arbitrary voltage by the choke coil 3 and on/off operation of the switching element 11. The boosted arbitrary voltage is the DC voltage having a peak value larger than the peak value of output voltage of the rectifier circuit 2. The boosted voltage is supplied to both ends of the smoothing capacitor 6 and is smoothed. In this embodiment, a MOSFET having a fast switching speed is used as the switching element 4 in order to operate the power factor correction circuit 7 in a high frequency and improve a power factor correction effect. Normally, although a protective diode is attached to the MOSEFT in an opposite direction, a basic operation of this embodiment is not influenced by the MOSFET without this protective diode, and therefore description of the protective diode is omitted in the figure.

The booster circuit 14 has the smoothing capacitor 6, being the first capacitor; the choke coil 8, being the second choke coil; a snubber capacitor 9; a diode 10; the switching element 11, being the second switching element (IGBT in this embodiment); a diode 12, being the second diode; and a smoothing capacitor 13. The input terminal of the choke coil 8 is connected to the connection point of the cathode terminal of the diode 5 and the higher potential side output terminal of the smoothing capacitor 6. The snubber capacitor 9 is connected between the output terminal of the choke coil 8 and the lower potential side terminal of the smoothing capacitor 6. A parallel circuit of the diode (which is an element for reverse conduction) 10 and the switching element 11 is connected in parallel to the snubber capacitor 9. In addition, the anode terminal of the diode (which is an element for reverse conduction) 12 is connected to the higher potential side terminal (collector) of the switching element 11. The smoothing capacitor 13 is connected between the cathode terminal of the diode 12 and the lower potential-side terminal (emitter) of the switching element 11. The voltage of the smoothing capacitor 13 is obtained by boosting the voltage of the smoothing capacitor 6 to the DC voltage having a peak value larger than the peak value of the voltage of the smoothing capacitor 6, and this voltage is supplied to input terminals of the inverter circuit 15.

The inverter circuit 15 has switching elements 16 and 17 connected in series, diodes 18 and 19 connected in reversely parallel to the switching elements 16 and 17, a snubber capacitor 20 connected to the switching element 17 in parallel, and a series circuit of a heating coil 21 and a resonant capacitor 22 connected to the switching element 17 in parallel. The input terminal of the inverter circuit 15 is connected to the output terminal of the booster circuit 14, that is, to both ends of the smoothing capacitor 13. The series circuit of the switching elements 16 and 17 is connected to the both ends of the smoothing capacitor 13. The diodes 18 and 19 are connected to the switching elements 16 and 17 in reversely parallel (so that the higher potential-side terminal (collector) of the switching element and the cathode-side terminal of the diode are connected to each other), respectively. In addition, the snubber capacitor 20 is connected to the switching element 17 (or switching element 16) in parallel. Further, a series connected part of the heating coil 21 and the resonant capacitor 22 is connected to the switching element 17 (or switching element 16) in parallel. The heating coil 21 is arranged opposite to a bottom surface of the object to be heated 23 such as a pan, being a load.

The induction heating apparatus of this embodiment further has an inverter circuit controller 28, a booster circuit controller 32, a power factor correction circuit controller 33, and an operation unit 39.

The inverter circuit controller 28 includes an input current detector 25 for detecting an input current of the induction heating apparatus; a reference current setting unit 24 for outputting a current reference value according to an input setting determined by an operation content of a user, a microcomputer 26, and a variable conduction ratio setting unit 27 for setting a conduction ratio of the switching elements 16 and 17. The microcomputer 26 compares a signal outputted from the input current detector 25 with a signal outputted from the reference current setting unit 24, and outputs a signal to the variable conduction ratio setting unit 27 so as to obtain a prescribed input. The variable conduction ratio setting unit 27 sets the conduction ratio of the switching elements 16 and 17 in a drive frequency set by the microcomputer 26, and performs conduction control of the switching element 16 and the switching element 17 exclusively.

The booster circuit controller 32 includes a microcomputer 26; a voltage detector 29 for detecting the voltage of the smoothing capacitor 13, being the input voltage of the inverter circuit 15; a reference voltage setting unit 30; a variable conduction ratio setting unit 31 for setting the conduction ratio of the switching element 11. The microcomputer 26 compares the signal outputted from the voltage detector 29 with the voltage of the reference voltage setting unit 30, and outputs the signal to the variable conduction ratio setting unit 31 so as to obtain the prescribed voltage of a smoothing capacitor 13. The variable conduction ratio setting unit 31 sets the conduction ratio of the switching element 11 in a drive frequency set by the microcomputer 26, and performs conduction control of the switching element 11. By sharing the microcomputer 26 between the booster circuit controller 32 and the inverter circuit controller 28, the circuit and control can be simplified.

The power factor correction circuit controller 33 controls the drive of the switching element 4 of the power factor correction circuit 7. The power factor correction circuit controller 33 includes an input current detector 34 for detecting an input current of the induction heating apparatus; a reference sine wave detector 35 for detecting the input voltage of the induction heating apparatus; a power factor correction circuit drive controller IC 36; a conduction ratio setting unit 37 for setting the conduction ratio of the switching element 4; and an oscillator 38. The power factor correction circuit drive controller IC 36 compares the output of the input current detector 34 with the output of the reference sine wave detector 35, and outputs the signal to the conduction ratio setting unit 37. The conduction ratio setting unit 37 sets the conduction ratio of the switching element 4 in a drive frequency set by the oscillator 38 so as to obtain an input current waveform equivalent to a reference sine wave voltage waveform, and performs conduction control of the switching element 4. Further, the power factor correction circuit drive controller IC 36 has a communication port with the microcomputer 26 included in the inverter circuit controller 28 and the booster circuit controller 32, so that the microcomputer 26 can control the operation of the power factor correction circuit drive controller IC 36 at an arbitrary timing.

The operation unit 39 transmits an operation content of a user to the microcomputer 26. Based on reception content from the operation unit 39, the microcomputer 26 performs start of heating, adjustment of heating power, and stop of heating.

[Operation of the Induction Heating Apparatus]

In the induction heating apparatus thus constituted, the operation will be explained hereunder. FIG. 2 (*a*) to (*e*) shows the voltage or the current waveform of each part of the induction heating apparatus according to this embodiment. FIG. 2(*a*) shows a waveform of an AC voltage of the commercial power 1. FIG. 2(*b*) shows an output voltage waveform of a DC power, that is, an output voltage waveform of the rectifier circuit 2. This voltage is inputted in the power factor correction circuit 7, then boosted, and outputted to the smoothing capacitor 6. FIG. 2(*c*) is a view of the waveform of the voltage applied to the smoothing capacitor 6, that is, the output voltage waveform of the power factor correction circuit 7, and the input voltage waveform of the booster circuit 14. FIG. 2(*d*) is a view of the waveform applied to the smoothing capacitor 13, that is, the output voltage waveform of the booster circuit 14, and the input voltage waveform of the inverter circuit 15. FIG. 2(*e*) shows a high frequency current waveform generated in the heating coil 21.

First, the operation of the power factor correction circuit 7 will be explained. The commercial power 1 shown in FIG. 2(*a*) is full wave rectified by the rectifier 2, to form the DC power of the voltage waveform shown in FIG. 2(*b*). This DC power is supplied between the input terminals of the power factor correction circuit 7. When a magnitude of an instantaneous value of the DC power supply voltage is smaller than the voltage of the smoothing capacitor 6, the diode 5 and the bridge diode of the rectifier circuit 2 included in the power factor correction circuit 7 can not be turned on, thus distorting the input current waveform, and the power factor of the power factor correction circuit 7 is extremely lowered. At that time, the power factor correction circuit controller 33 changes the output of the conduction ratio setting unit 37 so that the current waveform detected by the input current detector 34 is equivalent to the waveform detected by the reference sine wave detector 35, and turns on/off the switching element 4. In a state that the first switching element 4 is turned on, energy is accumulated in the choke coil 3 from the commercial power 1. Thereafter, when a conduction time set in the conduction ratio setting unit 37 is elapsed, the switching element 4 is turned off, and the energy accumulated in the choke coil 3 is supplied to the smoothing capacitor 6 via the diode 5. Thus, the input current flows from the commercial power 1 to the choke coil 3. A distorted input current is not allowed to flow to the commercial power 1. In addition, in this embodiment, the power factor correction circuit 7 has not only the power factor correction function but also the boosting function. Therefore, as shown in FIG. 2(*c*), the peak value of the voltage of the smoothing capacitor 6 becomes larger than the peak value of the commercial power 1, being the peak value of the DC power, that is, the peak value of the input voltage of the power factor correction circuit 7. This voltage is supplied to the inverter circuit 15 via the smoothing capacitor 13.

Next, the operation of the booster circuit 14 will be explained. The booster circuit 14 accumulates the energy in the choke coil 8 during a period in which the switching element 11 is turned on, and when the switching element 11 is turned off, the boosting operation is performed by charging the smoothing capacitor 13 via the diode 12 with the energy accumulated in the choke coil 8. In this embodiment, operation frequency and conduction time of the switching element 11 are made variable, thus adjusting the voltage of the smoothing capacitor 13. In addition, the diode 12 is provided between the smoothing capacitor 13 and the higher potential-side terminals of and the switching element 11, and the snubber capacitor 9 is connected to the switching element 11 in parallel. Therefore, when the switching element 11 is turned off, the snubber capacitor 9 starts charging, with an inclination caused by resonance of the choke coil 8 and the snubber capacitor 9, and the switching element 11 realizes a so-called ZVS (Zero Voltage Switching) turn-off operation. In addition, while the switching element 11 is turned off, the diode 12 is turned on when the voltage of the snubber capacitor 9 becomes the same as the voltage of the smoothing capacitor 13, and the voltage is fixed so as to be equivalent to the voltage of the smoothing capacitor 13. Thereafter, when the voltage of the smoothing capacitor 13 is higher than the voltage of the snubber capacitor 9, the diode 12 is turned off and the snubber capacitor 9 starts discharge, and when the snubber capacitor 9 completes the discharge, the diode 10 is turned on.

In this embodiment, after completing the discharge of the snubber capacitor 9, a continuous drive mode in which the switching element 11 is turned on in a prescribed time is used. However, there is no problem in turning on the switching element 11 after a prescribed time or more is elapsed from the completion of discharge by the snubber capacitor 9. Also, the operation is possible even if the switching element 11 is turned on before the snubber capacitor 9 completes the discharge. However, in this case, the current flowing through the choke coil 8 flows rapidly to the switching element 11, thus increasing a loss. Therefore, after the snubber capacitor 9 completes the discharge, the switching element 11 is turned off in a prescribed time.

Next, the operation of the inverter circuit 15 will be explained. As shown in FIG. 2(*c*), the voltage generated in the smoothing capacitor 6 connected between output terminals of the power factor correction circuit 7 is boosted by the booster circuit 14 as shown in FIG. 2(*d*), and is outputted to the smoothing capacitor 13. The voltage value of the smoothing capacitor 13 is adjusted by being increased and decreased so that a power set in the operation unit 39 by the user is inputted in the object to be heated 23. The DC voltage outputted to the both ends of the smoothing capacitor 13 so as to be smoothed is supplied to the inverter circuit 15. The inverter circuit 15 generates the high frequency current of a prescribed frequency in the heating coil 21 as sown in FIG. 2(*e*) by turning on/off of the switching elements 16 and 17. When the snubber element 16 is switched to the off-state from the on-state, the snubber capacitor 20 discharges electricity, with a gentle inclination caused by the resonance of the heating coil 21 and the snubber capacitor 20. Therefore, the switching element 16 realizes a zero volt switching (ZVS) turn-off operation. When the snubber capacitor 20 completes discharging of electricity, the diode 19 is turned on. When an on-signal is added to a gate of the switching element 17 to be set in a standby mode during the period in which the diode 19 is turned on, a direction of a resonance current of the heating coil 21 is inverted to turn off the diode 19. The current is commutated to the switching element 17, and the switching element 17 realizes a ZVS & Zero current switching (ZCS) turn-off operation. When the switching element 17 is switched to the off-state from the on-state, the snubber capacitor 20 is charged, with a loose inclination caused by the resonance of the heating coil 21 and the snubber capacitor 20. Thus, the switching element 17 realizes the ZVS turn-off operation. When the snubber capacitor 20 is charged up to the same voltage as the voltage of the smoothing capacitor 13, the diode 18 is turned on. When the on-signal is added to the gate of the switching element 16 to be set in a standby mode during the period in which the diode 18 is turned on, the direction of a resonance current of the heating coil 21 is inverted to turn off the diode 18. The current is commutated to the switching element 16. Thus, the switching element 16 realizes a ZVS & ZCS turn-on operation.

In this embodiment, the switching elements 16 and 17 are alternately turned on/off at a space of dead time of 2 μs to prevent the smoothing capacitor 13 from shorting. Also, the high frequency power is controlled by making a conduction time variable, with the drive frequency of the switching elements 16 and 17 fixed. The drive frequencies of the booster circuit 14 and the inverter circuit 15 are made identical to each other, thus preventing an audible sound from being generated, which is caused by a difference in the drive frequencies of the booster circuit 14 and the inverter circuit 15. However, needless to say, the high frequency power is controllable even if the drive frequency of the inverter circuit 15 is variable.

[Stop of the Induction Heating Apparatus]

Next, explanation will be given to the stop timing of the power factor correction circuit 7, the booster circuit 14, and the inverter circuit 15, at the time of stopping the heating operation of the induction heating apparatus. In the induction heating apparatus of this embodiment, when the user gives a heating stop instruction to the operation unit 39, the operation unit 39 transmits the heating stop instruction to the microcomputer 26. The microcomputer 26 that receives the heating stop instruction fixes the drive frequency and the conduction time of the inverter circuit 15, to a prescribed fluctuation width or less, thereby suppressing the fluctuation of the output of the inverter circuit 15, and outputs the signal of stopping the boosting operation of the booster circuit 14 to the variable conduction ratio setting unit 31 of the booster circuit 14 having a larger boosting voltage width than the power factor correction circuit 7. When the microcomputer 26 outputs the boosting operation stop signal of the booster circuit 14 to the variable conduction ratio setting unit 31 and a prescribed period (third drive stop period) is elapsed, the microcomputer 26 outputs the signal of stopping the operation of the power factor correction circuit 7 to the power factor correction circuit controller IC 36. When the signal of stopping the operation of the power factor correction circuit 7 is outputted to the power factor correction circuit controller IC 36 and a prescribed period (fourth drive stop period) is elapsed, the microcomputer 26 outputs the signal of stopping the operation of the inverter circuit 15 to the variable conduction ratio setting unit 27. The length of the third drive stop period and length of the fourth drive stop period are differentiated to correspond to the length of a discharge time of the smoothing capacitor 13 after stopping the drive of the booster circuit 14 and a discharge time of the smoothing capacitor 6 after stopping the drive of the power factor correction circuit, respectively. Thus, after the operation of the booster circuit 14 is preferentially stopped prior to stopping the inverter circuit 15, the operation of the power factor correction circuit 7 is stopped. Thus the heating operation of the inverter circuit 15 is finally stopped.

The booster circuit 14 and the power factor correction circuit 7 having the boosting function are preferentially stopped prior to stopping the inverter circuit 15. Therefore, it is possible to stop the circuit having the boosting function, in a state that large and small of the load impedance viewed from the circuit having the boosting function, that is, large and small of the output value of the inverter circuit 15 including the heating coil 21 and the object to be heated 23, is not rapidly changed. Therefore, no excessive boosting of the output voltage of the power factor correction circuit 7 and the booster circuit 14 occurs. Accordingly, it is possible to prevent the output capacitor 13 of the circuit having the boosting function and the switching elements 16 and 17 of the inverter circuit 15 from being applied with the voltage exceeding the respective breakdown voltage.

The inverter circuit controller 28 stops the inverter circuit 15 at a timing satisfying at least one of following conditions (1) to (4), and preferably stops the inverter circuit 15 at a timing satisfying all of the conditions (1) to (4).

Condition (1): The microcomputer 26 measures an elapsed time from outputting the boosting operation stop signal to the booster circuit controller 32 that controls the boosting operation of the booster circuit 14, or an elapsed time from outputting the boosting operation stop signal to the power factor correction circuit controller 33 that controls the boosting operation of the power factor correction circuit 7. The condition is that the measured elapsed time reaches a drive stop period. The previously determined drive stop period is previously determined in consideration of a delay time required to stop and get, in a stable state, the booster circuit 14 and the power factor correction circuit 7. For example, regarding the booster circuit 14, the previously determined drive stop period may be a time required for making the voltage of the smoothing capacitor 13 drop to a prescribed voltage or less after outputting the boosting operation stop signal to the booster circuit controller 32. Regarding the power factor correction circuit 7, the previously determined drive stop period may be a time required for making the voltage of the smoothing capacitor 6 or 13 drop to a prescribed voltage or less after outputting the drive stop signal to the power factor correction circuit controller 33.

Condition (2): After the microcomputer 26 outputs the drive stop signal to the booster circuit controller 32 and the power factor correction circuit controller 33, the boosted output voltage detector 29 for detecting the output voltage of the booster circuit 14 detects a voltage level of a prescribed voltage or less. Preferably, the prescribed voltage is determined in a range of not more than a voltage peak value of the commercial power 1.

Condition (3): After the microcomputer 26 outputs the drive stop signal to the booster circuit controller 32 and the power factor correction circuit controller 33, an input current value detected by the input current detector 25 of the induction heating apparatus or an input power calculated by the input current value becomes a prescribed input current value or a prescribed input power value or less. The prescribed input power value may be determined based on the power factor calculated from an input filter included in the rectifier circuit 2, the voltage of the commercial power 1, and the fixed drive frequency and the conduction time of the inverter circuit 15.

Condition (4): After the microcomputer 26 outputs the drive stop signal to the booster circuit controller 32 and the power factor correction circuit controller 33, then the booster circuit controller 32 and the power factor correction circuit controller 33 transmit, to the microcomputer 26, a signal showing that the conduction time of the switching elements in the booster circuit 14 and the power factor correction circuit 7 becomes a prescribed time or less, and the microcomputer 26 completes a reception of this signal. In this case, the booster circuit controller 32 and the power factor correction circuit controller 33 constitute a conduction time measurement part for measuring the conduction time of the switching elements of the booster circuit 14 and the power factor correction circuit 7.

Further, in this embodiment, a time ratio for driving/stopping the inverter circuit 15 is provided to control an input power area that can not be controlled or difficult to be controlled by a conduction time ratio of the switching element 16 and the switching element 17 of the inverter circuit 15. When such a control method is performed, in case of stopping the inverter circuit 15 from driving, the inverter circuit 15 is stopped in the same procedure as the heating stop method explained in this embodiment, thus making it possible to obtain the same effect.

When an input power is controlled by PDM (Pulse Density Modulation) for changing the time ratio of a drive/stop of the switching elements 16 and 17 of the inverter circuit 15, the booster circuit 14 is stopped before the inverter circuit 15 is temporarily stopped, next, the power factor correction circuit 7 is stopped, and thereafter the inverter circuit 1 is stopped. Each load impedance viewed from the booster circuit 14 and the power factor correction circuit 7 is in a state of having small fluctuation because the inverter circuit 15 is driven. Accordingly, the booster circuit 14 and the power factor correction circuit 7 are prevented from excessively boosting each output voltage beyond the breakdown voltage of the output capacitor of each circuit and the switching elements 16 and 17 of the inverter circuit 15. The booster circuit 14 and the power factor correction circuit 7 can be safely stopped.

In addition, by stopping the booster circuit 14 prior to the power factor correction circuit 7, it is possible to suppress lowering of the power factor during a stop processing period of the booster circuit 14. This makes it possible to shorten a period in which the booster circuit 14 is operated in a state of lowered power factor.

Note that in the above-described embodiment, the power factor correction circuit 7 and the booster circuit 14 are stopped before the inverter circuit 15 is stopped. However, the inverter circuit 15 may be stopped before the power factor correction circuit 7 and the booster circuit 14 are stopped. In this case, the boosting operation of the booster circuit 14 is stopped within a prescribed time from the stop of the inverter circuit 15 without a prescribed delay or more from the stop of the operation of the inverter circuit 15, so as to suppress a boosting range of the voltage boosted by the booster circuit 14 and outputted to the inverter circuit 15 by a fluctuation of the load impedance viewed from the booster circuit 14 accompanying with the stop of the operation of the inverter circuit 15. That is, the operation of the booster circuit 15 is stopped before the output voltage of the booster circuit 14 exceeds a prescribed voltage by a boosting action of the booster circuit 14. The power factor correction circuit 7 is stopped after the booster circuit 15 is stopped. Thus, the same effect as that of this embodiment can be obtained.

Note that in this embodiment, although both of the power factor correction circuit controller 33 and the booster circuit 14 have the boosting function, only the booster circuit 14 may have the boosting function. In the stop operation in this case, the microcomputer 26 may output the signal of stopping the operation of the inverter circuit 15 to the variable conduction ratio setting unit 27, when a prescribe period (first drive stop period) is elapsed after the stop signal of boosting operation of the booster circuit 14 is outputted to the variable conduction ratio setting unit 31.

In addition, when only the power factor correction circuit 7 has the boosting function, for example, when the induction heating apparatus has only the power factor correction circuit 7 having the boosting function without having the booster circuit 14, the microcomputer 26 may output the signal of stopping the operation of the power factor correction circuit 7 to the power factor correction controller IC 36, and after a prescribed period (second drive stop period) is elapsed, the microcomputer 26 may output the signal of stopping the operation of the inverter circuit 15 to the variable conduction ratio setting unit 27.

In addition, the booster circuit controller 32 may stop the boosting operation of the booster circuit 14 while restricting the fluctuation of the conduction time of the switching element of the booster circuit 14 so that the fluctuation width of the output value of the inverter circuit 15 is set at a prescribed value or less. Further, the booster circuit controller 32 may stop the boosting operation of the booster circuit 14 while fixing the output value of the inverter circuit 15 at a prescribed value.

As described above, the induction heating apparatus according to this embodiment (called this induction heating apparatus hereunder) is provided with the power factor correction circuit 7 and the booster circuit 14 as a boosting function unit for boosting an input power to a DC voltage having a peak value larger than the peak value of an input DC power and outputting this DC voltage. The power factor correction circuit 7 boosts the voltage by on/off operation of the switching element 4 (first switching element), and the booster circuit 14 boosts the voltage by on/off operation of the switching element 11 (second switching element). In addition, this induction heating apparatus has the inverter circuit 15 for generating the high frequency current in the heating coil 21. The inverter circuit 15 inputs the voltage boosted by the power factor correction circuit 7 and the booster circuit 14 and generates the high frequency current, by on/off operation of other switching element 16 and switching element 17.

In addition, this induction heating apparatus is provided with the power factor correction circuit controller 33 for controlling the boosting operation of the power factor correction circuit 7 and the booster circuit controller 32 for controlling the boosting operation of the booster circuit 14, as a boosting control unit that controls the boosting operation of the boosting function unit, and also is provided with the inverter circuit controller 28 that controls the operation of the inverter circuit 15. With this structure, this induction heating apparatus can change the step up value of the input voltage of the inverter circuit 15 with a degree of freedom to the operation of the inverter circuit 15 to finely and variably control the output of the inverter circuit 15

In addition, according to this induction heating apparatus, the power factor correction circuit controller 33 and the booster circuit controller 32 constituting the boosting control unit stop the boosting operation according to the power factor correction circuit controller 33 and the booster circuit controller 32, prior to the stop of the operation of the inverter circuit 15 by the inverter circuit controller 28. With this structure, when the heating operation is stopped, it is possible to surely prevent a sudden large fluctuation of the load impedance viewed from the booster circuit 14 and the excessively boosting of the output voltage of the booster circuit 14 because the load inverter circuit 15 is driven while at least the booster circuit 14 performs the boosting operation. The output voltage of the booster circuit 14 can immediately drop to safely stop the heating operation.

In addition, this induction heating apparatus is provided with the power factor correction circuit 7 (boosting function unit) that inputs the DC power obtained by rectifying the AC power, boosts a voltage of this DC power to the voltage having a peak value larger than the peak value of the voltage of the input DC power, outputs this boosted voltage to the smoothing capacitor 6, and corrects the power factor of the AC power; and the power factor correction circuit controller 33 (boosting control unit) that controls the operation of the power factor correction circuit 7. Thus, since the power factor correction circuit 7 has the boosting function and the power factor correction function simultaneously, the miniaturization of the power boosting/power factor correction circuit is realized at a low cost. In addition, the boosting operation of the power factor correction circuit 7 is stopped prior to the stop of the operation of the inverter circuit 15. Thus, the inverter circuit 15 being a load is driven while at least the power factor correction circuit 7 performs the boosting operation. Accordingly, when the heating operation is stopped, it is possible to surely prevent the excessively boosting of the output voltage of the power factor correction circuit 7 which is caused by a sudden large fluctuation of the load impedance viewed from the power factor correction circuit 7. The output voltage of the power factor correction circuit 7 can immediately drop to safely stop the heating operation.

In addition, the booster circuit controller 32 stops the boosting operation of the booster circuit 14 prior to the stop of the operation of the power factor correction circuit 7 by the power factor correction circuit controller 33. Thus, this induction heating apparatus prevents the inverter circuit 15 from being operated in a state of losing the power factor correction function of the power factor correction circuit 7, and thereby prevents the inverter circuit 15 from influencing a surrounding power supply environment.

In addition, according to this induction heating apparatus, by an instruction of the microcomputer 26, the inverter circuit controller 28 limits the fluctuation of the conduction time of the switching elements 16 and 17 for driving the inverter circuit 15, so that the fluctuation width of the output value of the inverter circuit 15 is a prescribed value or less, to realize a stabilization of the load impedance viewed from the power factor correction circuit 7 and the booster circuit 14. While such a limit state is maintained (for example, while the switching elements 16 and 17 are operated with the operation frequency or the drive time ratio set at a prescribed fluctuation width or less), the power factor correction circuit controller 33 and the booster circuit controller 38 stop the boosting operation of the power factor correction circuit 7 and the booster circuit 14. Thus, the fluctuation amount of this load impedance is suppressed in a process of stopping the boosting operation of the power factor correction circuit 7 and the booster circuit 14. Therefore, the output voltages of the power factor correction circuit 7 and the booster circuit 14 are not excessively boosted beyond the breakdown voltage of the output capacitor (smoothing capacitors 6 and 13) constituting each circuit and the switching elements 16 and 17 of the inverter circuit 15, so that the circuits can be safely stopped. Note that the inverter circuit controller 28 may control the conduction time of the switching elements 16 and 17 for driving the inverter circuit 15, so that the output value of the inverter circuit 15 is fixed to a prescribed value. In such a control state, the power factor correction circuit controller 33 and the booster circuit controller 38 may stop the boosting operation of the power factor correction circuit 7 and the booster circuit 14.

In addition, according to this induction heating apparatus, by the instruction of the microcomputer 26, the power factor correction circuit controller 33 stops the boosting operation of the power factor correction circuit 7 when a third drive stop period, in which the voltage of the smoothing capacitor 13 drops, is elapsed after the booster circuit controller 32 stops the boosting operation of the booster circuit, and thereafter the inverter circuit controller 28 stops the drive of the inverter circuit 15 when the voltage of the smoothing capacitor 6 drops after the elapse of a fourth drive stop period. The length of the third drive stop period and the length of the fourth drive stop period are differentiated to correspond to the length of the discharge time of the smoothing capacitor 13 after the drive of the booster circuit 14 is stopped, and the discharge time of the smoothing capacitor 6 after the drive of the power factor correction circuit 7 is stopped, respectively. Thus, the third drive stop period and the fourth drive stop period, which are necessary for the booster circuit 14 and the power factor correction circuit 7 to be surely set in the drive stop states, can be appropriately secured and total time of them can be shortened.

In addition, this induction heating apparatus includes a boosted output voltage detector 29 that detects the output voltage of the power factor correction circuit 7 or the booster circuit 14, being the boosting function unit. The inverter circuit controller 28 may stop the drive of the inverter circuit 15 when the output voltage detected by the boosted output voltage detector 29 becomes a prescribed value or less after the boosting operation is stopped by the power factor correction circuit controller 33 or the booster circuit controller 32, being the boosting control unit. It becomes possible to detect a condition that the power factor correction circuit 7 or the booster circuit 14 is set in a stable state or is close to the stable state after the boosting operation is stopped. The load impedance viewed from the boosting function unit is in a state to have small fluctuation until the stable state is detected, because the inverter circuit 15 is driven. Therefore, the boosting function unit can be safely stopped without excessively boosting the output voltage beyond the breakdown voltage of the output capacitor being the constituent component of the boosting function unit and the switching elements of the inverter circuit.

In addition, the boosting operation of the power factor correction circuit 7 (the boosting function unit) and the booster circuit 14 (the boosting function unit) may be stopped without prescribed or more delay from the stop of the operation of the inverter circuit 15, so that the boosting range of the voltage boosted and outputted, by the boosting function unit, due to the fluctuation of the load impedance which is viewed from the boosting function unit and which is caused accompanied with the stop of the operation of the inverter circuit 15, is suppressed to a prescribed value or less. With this structure, the boosting operation is stopped before the output voltage is higher to a prescribed value or more accompanied with the stop of the operation of the inverter circuit 15, and it is possible to prevent the excessively boosting of the output voltage of the power factor correction circuit 7 and the booster circuit 14 beyond the breakdown voltage.

In addition, in case that the power factor correction circuit 7 has no boosting function, the microcomputer 26 may give an instruction for stopping the drive of the inverter circuit 15 to the variable conduction ratio setting unit 27, when the first drive stop period, in which the voltage of the smoothing capacitor 9 drops, is elapsed after the stop of the boosting operation of the booster circuit 14. The load impedance viewed from the booster circuit 14 can be set in a state to have small fluctuation because the inverter circuit 15 is continuously driven during a period in which the booster circuit 14 becomes in a stable stop state and the voltage of the smoothing capacitor 13, which is applied with the output voltage of the booster circuit 14, drops. Therefore, the output voltage of the booster circuit 14 drops immediately and the booster circuit 14 is stopped safely, without excessively boosting the output voltage beyond the breakdown voltage of the smoothing capacitor 13 being an output capacitor of itself, and the switching element of the inverter circuit 15.

In addition, in case that only the power factor correction circuit 7 has the boosting function, the inverter circuit controller 28 may stop the drive of the inverter circuit 15 under the instruction of the microcomputer 26 that receives the signal from the power factor correction circuit controller 33, when the second drive stop period, in which voltages of the smoothing capacitor 6 and the smoothing capacitor 13 drop, is elapsed after the power factor correction circuit controller 33 stops the boosting operation of the power factor correction circuit 7. Thus, the load impedance viewed from the power factor correction circuit 7 can be set to have a small fluctuation state during a period from a stable stop state of the power factor correction circuit 7 until the voltage of the smoothing capacitor 6 drops, to which the output voltage is added. Therefore, the voltage of the power factor correction circuit 7 drops immediately and the power factor correction circuit 7 can be safely stopped, without excessively boosting the output voltage beyond the breakdown voltage of its own output capacitor and the switching element of the inverter circuit 15.

Although the present invention has been described in connection with specified embodiments thereof, many other modifications, corrections and applications are apparent to those skilled in the art. Therefore, the present invention is not limited by the disclosure provided herein but limited only to the scope of the appended claims.

INDUSTRIAL APPLICABILITY

The induction heating apparatus of the present invention has an advantage of preventing the booster circuit having a boosting function or the power factor correction circuit having the boosting function from excessively boosting each output voltage, and stopping the drive of the booster circuit and the power factor correction circuit when heating is stopped. Therefore, the induction heating apparatus of the present invention is useful not only as an induction heating cooking device but also as an induction heating type copy roller, an induction heating type melting furnace, an induction heating type rice cooker, or other induction heating type apparatus.

The invention claimed is:

1. An induction heating apparatus, comprising:
a boosting function unit that includes a choke coil and a first switching element, the first switching element having a high potential side terminal connected to an output end of the choke coil and being used for a boosting operation in which the first switching element is turned on to accumulate energy in the choke coil and is turned off to supply the energy to a capacitor of an output side via a diode, wherein the boosting function unit inputs a direct-current power, boosts the direct-current power to a direct-current voltage having a peak value larger than a peak value of the direct-current power, and outputs the boosted direct-current voltage;
an inverter circuit having a heating coil and which inputs the direct-current voltage output from the booster function unit to generate a high frequency current in the heating coil by on/off operation of a second switching element;
a boosting control unit that controls the boosting operation of the boosting function unit by conduction-controlling the first switching element; and
an inverter controller that controls an operation of the inverter circuit,
wherein, in order to stop a heating operation of the induction heating apparatus, the boosting control unit stops the boosting operation of the boosting function unit, and the inverter controller stops the operation of the inverter circuit after the boosting control unit stops the boosting operation of the boosting function unit.

2. The induction heating apparatus according to claim 1, wherein
the boosting function unit comprising:
a power factor correction circuit that inputs a direct-current power obtained by rectifying an alternating-current power, boosts the direct-current power to the voltage having the peak value larger than the peak value of the direct-current power, and outputs the boosted voltage to a first capacitor, and corrects a power factor of the alternating-current power,
the boosting control unit comprising:
a power factor correction circuit controller that controls an operation of the power factor correction circuit,
wherein the power factor correction circuit controller stops the boosting operation of the power factor correction circuit, prior to the stop of the operation of the inverter circuit.

3. The induction heating apparatus according to claim 2, wherein the inverter controller stops the drive of the inverter circuit when the power factor correction circuit controller stops the boosting operation of the power factor correction circuit and a second drive stop period is elapsed, the second drive stop period being a time period in which the voltage of the first capacitor drops.

4. The induction heating apparatus according to claim 1, wherein the boosting control unit stops the boosting operation of the boosting function unit when the inverter controller drives the inverter circuit while limiting a fluctuation of a conduction time of the second switching element so that a fluctuation width of an output value of the inverter circuit is a prescribed value or less, in order to suppress a amount of fluctuation of the load impedance viewed from the boosting function unit in process of stopping boosting operation of the boosting function unit.

5. The induction heating apparatus according to claim 4, wherein the boosting control unit stops the boosting operation of the boosting function unit when the inverter controller drives the inverter circuit while fixing the output value of the inverter circuit to the prescribe value, in order to fix the load impedance viewed from the boosting function unit in process of stopping boosting operation of the boosting function unit.

6. The induction heating apparatus according to claim 1, further comprising:
a boosted output voltage detector that detects an output voltage of the boosting function unit,
wherein the inverter controller stops the operation of the inverter circuit after the boosting control unit stops the boosting operation of the boosting function unit and the output voltage detected by the boosted output voltage detector reaches a prescribed value or less.

7. The induction heating apparatus according to claim 1, further comprising:
an input current detector that detects an input current,
wherein the inverter controller stops the operation of the inverter circuit after the boosting control unit stops the drive of the boosting function unit and the input current detected by the input current detector or an input power calculated by the input current reaches a prescribed value or less.

8. The induction heating apparatus according to claim 1, further comprising:
a conduction time measurement unit that measures a conduction time of the first switching element,
wherein the inverter controller stops the operation of the inverter circuit after the boosting control unit stops the boosting operation of the boosting function unit, the conduction time of the first switching element reaches a prescribed value or less, and the boosting control unit detects that the boosting operation of the boosting function unit is stably stopped.

9. The induction heating apparatus according to claim 1, wherein the boosting control unit stops conduction-controlling of the first switching element prior to stop of the operation of the inverter circuit controlled by the inverter controller such that the load impedance viewed from the boosting function unit is prevented from being changed rapidly and largely during a period in which the boosting function unit performs the boosting operation after the conduction-controlling of the switching element is stopped.

10. An induction heating apparatus, comprising:
a boosting function unit that inputs a direct-current power, boosts the direct-current power to a direct-current voltage having a peak value larger than a peak value of the direct-current power by on/off operation of a first switching element, and outputs the boosted direct-current voltage;
an inverter circuit having a heating coil and which inputs the direct-current voltage output from the booster function unit to generate a high frequency current in the heating coil by on/off operation of a second switching element;
a boosting control unit that controls a boosting operation of the boosting function unit; and
an inverter controller that controls an operation of the inverter circuit,
wherein the boosting function unit comprises:
(i) a power factor correction circuit that inputs the direct-current power obtained by rectifying an alternating-current power to output a smoothed direct-current voltage to a first capacitor, and corrects a power factor of the alternating-current power; and
(ii) a booster circuit that inputs the direct-current voltage output from the power factor correction circuit, boosts the input direct-current power to the direct-current voltage having a peak value larger than a peak value of the input direct-current voltage, and outputs the boosted direct-current voltage to a second capacitor,
wherein the boosting control unit comprises:
(i) a power factor correction circuit controller that controls the power factor correction circuit; and
(ii) a booster circuit controller that controls the booster circuit, and
wherein, in order to stop a heating operation of the induction heating apparatus, the boosting circuit controller stops the boosting operation of the booster circuit, and the inverter controller stops the operation of the inverter circuit after the boosting circuit controller stops the boosting operation of the booster circuit.

11. The induction heating apparatus according to claim 10, wherein
the power factor correction circuit boosts the input direct-current power to a voltage having a peak value larger than a peak value of the input direct-current power, and outputs the boosted voltage to the first capacitor; and
the power factor correction circuit controller stops the boosting operation of the power factor correction circuit, prior to the stop of the operation of the inverter circuit.

12. The induction heating apparatus according to claim 11, wherein the booster circuit controller stops the boosting operation of the booster circuit, prior to the stop of the boosting operation of the power factor correction circuit controlled by the power factor correction circuit controller.

13. The induction heating apparatus according to claim 11, wherein
after the booster circuit controller stops the boosting operation of the booster circuit and a third drive stop period is elapsed, the power factor correction circuit controller stops the boosting operation of the power factor correction circuit, the third drive stop period being a time period in which the voltage of the second capacitor drops;
thereafter, when a fourth drive stop period is further elapsed, the inverter controller stops the drive of the inverter circuit, the fourth drive stop period being a time period in which the voltage of the first capacitor drops; and
length of the third drive stop period and length of the fourth drive stop period are differentiated to correspond to length of a discharge time of the second capacitor after stopping the drive of the booster circuit and a discharge time of the first capacitor after stopping the drive of the power factor correction circuit, respectively.

14. The induction heating apparatus according to claim 11, wherein the power factor correction circuit comprises:
a first choke coil having an input end connected to the direct-current power; and
the first switching element,
wherein the first switching element has a high potential side terminal connected to an output end of the first choke coil, and is turned on to accumulate energy in the first choke coil and turned off to supply the energy to the first capacitor of an output side via a first diode.

15. The induction heating apparatus according to claim 10, wherein the inverter control unit stops the drive of the inverter circuit when the booster circuit controller stops the boosting operation of the booster circuit and a first drive stop period is elapsed, the first drive stop period being a time period in which a voltage of the second capacitor drops.

16. The induction heating apparatus according to claim 10, wherein the booster circuit comprises:
a second choke coil connected to an output end of the power factor correction circuit; and
the second switching element;
wherein the second switching element has a high potential side terminal connected to an output end of the second choke coil, and is turned on to accumulate energy in the second choke coil and turned off to supply the energy to the second capacitor of the output side via a second diode.

* * * * *